June 16, 1953 H. C. WATERMAN 2,642,077
VALVE
Filed Jan. 8, 1948

INVENTOR
HERBERT C. WATERMAN
BY
Cecil F Arens
ATTORNEY

Patented June 16, 1953

2,642,077

UNITED STATES PATENT OFFICE 2,642,077

VALVE

Herbert C. Waterman, Chicago, Ill., assignor to Bendix Aviation Corporation, South Bend, Ind., a corporation of Delaware Application January 8, 1948, Serial No. 1,139

12 Claims. (Cl. 137—117)

This invention relates to an improvement in a fluid control device, and more particularly to improved valve means used in fuel systems.

The device of the invention is particularly adaptable to fuel systems for engines the flow of fuel to which may be made a function of engine R. P. M., for example. The device illustrated is a combined electromagnetic control, regulator, and relief valve designed primarily for maintaining fuel flow proportional to an electric current when the fuel to the device is supplied from a pump having neither constant flow nor constant pressure output.

It is therefore an object of the invention to provide an electromagnetic control and regulator valve contained within a unitary housing and so constituted that pressure drop across the control valve is held fairly constant by said regulator valve which is sensitive to differential pressures measured between the inlet and outlet ports of the control valve.

Another object of the invention resides in the provision of a combined control, regulator, and relief valve for a fuel system.

A still further object of the invention resides in the provision of a device which combines control and regulator valves by employing a common movable element which controls flow through both valves independently.

The above and other objects and features of the invention will be apparent from the following description of the device taken in connection with the accompanying drawing which forms a part of this specification and in which.

Figure 1:
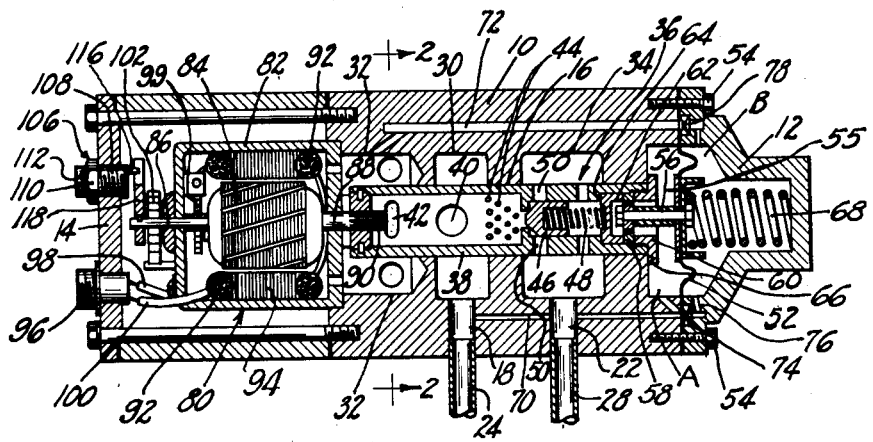
Figure 1 is a longitudinal sectional view of the device of the invention.

Referring now to the drawing and particularly Figure 1, the device of the invention comprises a body 10, equipped with end closures 12 and 14. The body 10 is provided with a bore 16 which communicates with inlet, outlet, and by-pass ports, 18, 20, and 22 respectively through conduits 24, 26, and 28.

The inlet and by-pass ports are adapted to be connected to the outlet and inlet sides respectively of a pump, not shown. The bore 16 is recessed at 30, 32, and 34 to provide axially spaced chambers into which one end of the conduits 24, 26 and 28 respectively extend. Valve means 36 is disposed in the bore 16 for controlling communication between the ports, and includes a sleeve 38 having openings 40, for connecting the interior of the sleeve with the inlet port, a pair of elongated slots 42, for communicating the inlet port with the outlet port through the interior of the sleeve 38, and a plurality of openings 44, for establishing flow between the inlet port and by-pass port, through the interior of sleeve 38. The sleeve is constituted for both axial and rotational motion. A relief valve 46 is located in sleeve 38 to respond to predetermined high pressures in the sleeve and inlet port to exhaust fluid to the by-pass port 22. The relief valve is normally urged to closed position by a spring 48. Radial passages 50 provide for the passage of fluid from the interior of sleeve 38 to the by-pass port 22 when the relief valve 46 is open.

Axial motion of the sleeve 38 is obtained by connecting one end of the sleeve to a movable wall or diaphragm 52, actuatable by differential pressures. The diaphragm is securely fastened between the end closure 12 and the body 10 by bolts 54, which pass through the end closure and threadedly engage the body. The closure 12 together with the body 10 form a chamber 55 which is divided into two opposing chambers A and B by the diaphragm 52. Equal areas are exposed on each side of the diaphragm. A connecting pin 56 has one end secured to the diaphragm and the other end rotatably mounted in a bearing member 58, carried by the sleeve 38. The bearing member 58 is held in place by a nut 60, which threadedly engages one end of the sleeve to thereby urge the bearing member against the cup-like element 62, which in turn abuts the reduced diameter 64, of the sleeve 38. Nut 60 is provided with a flange 66 which extends radially beyond the exterior of the sleeve so as to engage the body member to thereby limit axial movement of the sleeve to the left under the influence of a spring 68, interposed between the movable wall or diaphragm 52 and the end closure 12. A passage 70 connects chamber A, which is on the left side of the diaphragm 52, to the conduit 24, which is in communication with the inlet port 18. A passage 72 connects chamber B, which is on the right side of the diaphragm 52, to the recess 32, which communicates with the outlet port 20. With this arrangement, since equal areas are exposed on each side of the diaphragm, the pressure in recess 30, which is in communication with the inlet port 18, will be held higher than the pressure in outlet port 20 by an amount equal to the force exerted by spring 68. If the pressure differential across the diaphragm exceeds that amount, the valve sleeve will be pushed in a direction to compress the spring, to thereby uncover holes 44, to by-pass fluid to port 22.

To prevent valve hunting, suitable damping means is employed. Passage 70 is connected to the chamber B, through an orifice 74 and passageway 76. An orifice 78 is located in the passage 72, adjacent the chamber B. The relationship or orifice sizes is such that hunting is held to a minimum.

Figure 2:
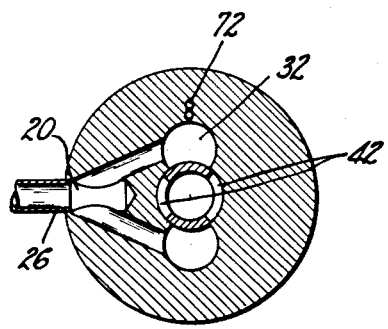
Figure 2 is a section taken on the line 2—2 of Figure 1.

Rotational motion of the sleeve 38 is provided by an electromagnetic device 80 suitably connected to one end of the sleeve and contained within a housing 82. A rotor 84, having shafts 86 and 88, is disposed within housing 82. The shaft 88 is drivably connected to sleeve 38 to impart rotary motion thereto. A spline 90 on shaft 88 allows the sleeve to be moved axially by differential pressure acting on diaphragm 52. Series field coils 92 are carried by field poles 94. An electrical power connector 96 is mounted on the end closure 14. A wire 98 has one end fastened to the connector and the other end to one end of the rotor coils via ground. A wire 100 has one end fastened to the connector and the other end to one end of one of the field coils 92. The field coils are connected in series with the rotor coils, this connection being made through a current carrying spiral 99. A torsion spring 102 has its inner end secured to shaft 86 and its outer end fastened to housing 82. The amount of rotation of the shaft, that is, the angular displacement of the rotor, will be proportional to the current through the device. The torsion spring is connected to the shaft in a manner to resist the rotation thereof caused by current through the device. A minimum flow adjustment 106 is associated with the electromagnetic device to regulate the initial opening or setting of the elongated slots 42. The adjustment comprises a screw 108 threadedly engaging the end closure 14 and held in a preselected position by a locknut 110. One end of the screw is slotted at 112 for screw driver adjustment, the other end of the screw extends through the end closure 14 and is provided with an eccentrically located pin 116 for engagement with an arm 118 keyed to shaft 86. It is obvious that the initial opening of elongated slots 42, in sleeve 38, is determined by the position of pin 116. These elongated slots 42 may be contoured to any desired shape to produce the desired flow versus current characteristics. As best shown in Figure 2, the present initial setting is for complete shut-off, that is, with no current passing through the electromagnetic device, the torsion spring rotates the sleeve to a position where communication between the inlet and outlet ports is cut off. The rotor 84 need turn only 90° to accomplish the desired valve opening and is normally held against stop 116 by the torsion spring 102. Current through the coils 92 produces a torque which rotates the rotor in a direction opposing the torque of spring 102 to thereby rotate the sleeve in a valve opening direction.

The fluid control device above described, is actually a combined electromagnetic control, regulator, and relief valve arranged in a unitary body. The control valve portion of the integrated device comprises the electromagnetic device, inlet and outlet ports, and that the part of sleeve 38 which contains openings 40, and the elongated slots 42. The regulator valve portion of the device includes the differential pressure means, inlet, outlet, and by-pass ports, and that part of the sleeve 38 which embraces openings 40 and 44. It will be noted that rotary motion of the sleeve controls fluid output and axial motion of the sleeve performs the regulating function of the device. The relief valve, as aforementioned, is disposed within the sleeve to limit the pressure therein to a preselected value.

Operation of the fluid control device is as follows:

With a pump, not shown, delivering fluid under pressure to the inlet port and the control valve closed, as shown in Figure 2, sleeve 38 will be axially shifted to the right under the influence of a differential in pressure acting on the diaphragm, so that fluid under pressure now enters at the inlet 18, passes through openings 40, into the interior of the sleeve and out through the holes 44, thence to the by-pass port 22. At this time all the fluid that enters the inlet port is circulated through the by-pass port.

Assume now that a current flows through the electromagnetic device, this will cause the sleeve to be rotated an amount proportional to the current flowing, whereby the elongated slots 42 communicate the outlet port with the inlet port. Opening slots 42, to thereby communicate the outlet port with the inlet port, changes the differential pressure across the diaphragm 52, whereby the sleeve 38 is axially shifted to the left under the influence of spring 68, closing some of the holes 44, so that less of the fluid entering the inlet port is by-passed to the by-pass port 22. Any further opening of the elongated slots will tend to further reduce the differential pressure on the diaphragm, whereby a further reduction in flow to the by-pass port is accomplished since the action of the regulator is to keep a constant differential pressure on the diaphragm. Restricting the elongated slots will on the other hand tend to increase the differential pressure across the diaphragm with a consequent shift of the sleeve to the right to permit more fluid to be by-passed through holes 44 to port 22. The function of the regulator valve is such as to produce a fairly constant pressure drop across the inlet and outlet ports.

Although only one embodiment of the invention has been illustrated and described various changes in the form and relative arrangements of the parts may be made to suit requirements.

I claim:

1. A fluid control device comprising a body, a bore in the body, inlet, outlet, and by-pass ports in the body in communication with the bore at different locations therein, valve means in the bore for controlling communication between the ports, said valve means including a sleeve with a passage in continuous communication with the inlet port, said sleeve being provided with a first opening communicating the interior thereof with the outlet port and a second opening communicating the interior of the sleeve with the by-pass port, said sleeve being arranged to rotate in the bore to control the first opening and to slide in the bore to control the second opening, means connecting the sleeve for rotation, and means connecting the sleeve for sliding motion including a device sensitive to an increase in pressure differential between the inlet and outlet ports to effect an increase in the area of the second opening.

2. A device of the class described in claim 1, wherein a relief valve is carried by said sleeve to communicate the inlet port with the by-pass port when the pressure in the former exceeds a preselected value.

3. A fluid control device comprising a body, a bore in the body, inlet, outlet, and by-pass ports in the body in communication with the bore at different locations therein, valve means in the bore for controlling communication between the ports, said valve means including a sleeve with a passage in continuous communication with the inlet port, said sleeve being provided with a first opening communicating the interior thereof with the outlet port and a second opening communicating the interior of the sleeve with the by-pass port, said sleeve being arranged to rotate in the bore to control the first opening and to slide in the bore to control the second opening, electromagnetic means connecting the sleeve for rotation in proportion to the current therethrough, means for sliding said sleeve including a device having a movable element responsive to pressure differential and connected to said sleeve to effect an increase in the area of the second opening upon an increase in the differential pressure, a connection from one side of the element to the inlet port, and a connection from the other side of the element to the outlet port.

4. A fluid control device comprising a body, a bore in the body, inlet, outlet, and by-pass ports in the body in communication with the bore at different locations therein, valve means in the bore having a predetermined position in which communication between the inlet port and the outlet and by-pass ports is cut off, said valve means embracing a member arranged in the bore to slide and to rotate from said predetermined position to thereby control communication from the inlet port to the by-pass and outlet ports respectively, said member being provided with a cavity having a continuous connection with said inlet port and with an opening thereinto establishing communication between said cavity and said outlet port, said member being further provided with means establishing communication between said cavity and said by-pass port, electromagnetic means connecting the member for rotation, and means for sliding said member including a device responsive to pressure differential between the inlet and outlet ports for effecting communication between the inlet and by-pass ports.

5. A fluid control device comprising a body, a bore in the body, inlet, outlet, and by-pass ports in the body in communication with the bore at different locations therein, valve means capable of concurrently controlling communication between all the ports including a hollow member rotatably and slidably arranged in the bore and provided with openings therein which respectively communicate said hollow member with the inlet, outlet, and by-pass ports, the opening between said hollow member and said outlet port being varied by rotation of said hollow member, the opening between said hollow member and said by-pass port being varied by sliding action of said hollow member, the opening between said hollow member and said inlet port establishing continouus communication therebetween, an electrical device connected to said hollow member and capable of rotating the same in proportion to the current through the device, and means responsive to changes in pressure differential across the variable opening between the inlet and outlet ports for sliding the hollow member in a direction to maintain a substantially constant pressure drop across said last named opening.

6. A fluid control device comprising inlet, outlet, and by-pass ports, a valve mechanism which controls flow between the inlet and outlet ports and maintains a substantially constant pressure drop between the inlet and outlet ports, said valve mechanism including a control valve interposed between the inlet and outlet ports and a regulator valve interposed between the inlet and by-pass ports, said control and regulator valves having a common control member constructed and arranged to receive one form of motion for controlling flow to the outlet port and another form of motion for controlling flow to the by-pass port, electromagnetic means connected to the control member to impart one form of motion thereto, and a device responsive to pressure differential between the inlet and outlet ports and connected to said control member to impart another form of motion thereto.

7. A fluid control device comprising inlet, outlet and by-pass ports, a valve mechanism which controls flow between the inlet and outlet ports and maintains a substantially constant pressure drop between the inlet and the outlet ports, said valve mechanism including a control valve interposed between the inlet and outlet ports and a regulator valve interposed between the inlet and by-pass ports, said control valve and regulator valve having a common control member in the form of a sleeve closed at its ends and with the interior thereof communicating with said inlet, outlet, and by-pass ports, said sleeve arranged to receive one form of motion for controlling flow to the outlet port and another form of motion for controlling flow to the by-pass port, electromagnetic means connected to the sleeve to impart one form of motion thereto, and a device responsive to differential pressure between the inlet and outlet ports and connected to said sleeve to impart another form of motion thereto.

8. A device of the class described in claim 7 wherein a relief valve is located in one end of said sleeve for relieving pressures in the sleeve when in excess of a predetermined value.

9. A mechanism for controlling flow comprising a body with inlet, outlet, and by-pass ports therein, a bore in the body, said bore having openings therein communicating with the respective ports, a sleeve in the bore provided with a first opening therein communicating the interior of the sleeve with the inlet port at all times, said sleeve having a second opening therein communicating the interior thereof with the opening in the bore which communicates with the outlet port and a third opening in the sleeve communicating the interior of the sleeve with the opening in the bore which communicates with the by-pass port, said sleeve being rotatable in the bore for changing the relationship of said second opening with respect to its associated opening in the bore, said sleeve being slidable in the bore for changing the relationship of said third opening with respect to its associated opening in the bore, electrical means connected to said sleeve for rotating the same, and a device responsive to pressure differential between the inlet and outlet ports and connected to said sleeve for sliding the same.

10. A fluid control device comprising a body, inlet, outlet, and by-pass ports in the body, valve means in the body comprising a hollow member communicating with the inlet port, a variable flow passage connecting said hollow member to said outlet port, a variable flow passage connecting said hollow member to said by-pass port, said hollow member having one form of motion for varying flow through said first mentioned passage and still another form of motion for varying flow through said second passage, an electrical device connected to said hollow member to impart said one form of motion thereto so as to vary the flow in said first mentioned passage in accordance with the current through said device, and means responsive to pressure differential between the inlet and outlet ports and connected to said hollow member to impart said second form of motion thereto.

11. A fluid control device comprising a body, inlet, outlet, and by-pass ports in the body, valve means in the body comprising a hollow member communicating with the inlet port, means in the hollow member and body for controlling flow between said hollow member and the outlet port, means in the hollow member and body for controlling flow between said hollow member and the by-pass port, said hollow member having one form of motion for controlling said first named means and another form of motion for controlling said second named means, electrical means connected to said hollow member to impart said one form of motion thereto, and means responsive to pressure differential between the inlet and outlet ports and connected to said hollow member to impart said second form of motion thereto.

12. A fluid control device comprising inlet, outlet, and by-pass ports, a valve mechanism which controls flow between the inlet and outlet ports and maintains a substantially constant pressure drop between the inlet and outlet ports, said valve mechanism including a control valve interposed between the inlet and outlet ports and a regulator valve interposed between the inlet and by-pass ports, said control and regulator valves having a common control member constructed and arranged to receive one form of motion for controlling flow to the outlet port and another form of motion for controlling flow to the by-pass port, means connected to the control member to impart one form of motion thereto, and a device responsive to pressure differential anterior and posterior to said control valve and connected to said control member to impart another form of motion thereto.

HERBERT C. WATERMAN.

References Cited in the file of this patent

UNITED STATES PATENTS

| Number | Name | Date |
|---|---|---|
| 1,350,885 | Rowe | Aug. 24, 1920 |
| 1,756,823 | Harris | Apr. 29, 1930 |
| 2,102,865 | Vickers | Dec. 21, 1937 |
| 2,208,473 | Ross | July 16, 1940 |
| 2,343,375 | Herman | Mar. 7, 1944 |
| 2,354,634 | Griswold | July 24, 1944 |
| 2,445,544 | Trautman | July 20, 1948 |
| 2,446,523 | Bradbury | Aug. 10, 1948 |
| 2,484,916 | Tucker | Oct. 18, 1949 |

FOREIGN PATENTS

| Number | Country | Date |
|---|---|---|
| 303,583 | Germany | Feb. 7, 1918 |